United States Patent
El-Moussa

(10) Patent No.: US 9,003,526 B2
(45) Date of Patent: Apr. 7, 2015

(54) DETECTING MALICIOUS BEHAVIOUR ON A NETWORK

(75) Inventor: Fadi J El-Moussa, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 13/510,545

(22) PCT Filed: Nov. 19, 2010

(86) PCT No.: PCT/GB2010/002146
§ 371 (c)(1),
(2), (4) Date: May 17, 2012

(87) PCT Pub. No.: WO2011/061509
PCT Pub. Date: May 26, 2011

(65) Prior Publication Data
US 2012/0278889 A1    Nov. 1, 2012

(30) Foreign Application Priority Data
Nov. 20, 2009   (EP) ..................................... 09252660

(51) Int. Cl.
*H04L 29/08* (2006.01)
*H04L 29/06* (2006.01)
*G06F 11/30* (2006.01)
*H04L 29/12* (2006.01)

(52) U.S. Cl.
CPC ....... *H04L 63/1425* (2013.01); *H04L 29/12066* (2013.01); *H04L 61/1511* (2013.01); *H04L 63/1475* (2013.01); *H04L 63/1483* (2013.01)

(58) Field of Classification Search
CPC .............. H04L 63/1408; H04L 69/329; H04L 63/0281; H04L 65/105; G06F 21/56; G06F 21/577
See application file for complete search history.

(56) References Cited

U.S. PATENT DOCUMENTS

2008/0072324 A1 *   3/2008   Repasi et al. .................... 726/23

OTHER PUBLICATIONS

Using Low-Interaction Honeypots to Study theAbuse of Open Proxies to Send Spam. Jensen et al. Dec. 2007.*
Realtime Proxy Abuse Triangulation. Steve Friedhl. 2002.*
International Search Report (2 pgs.) dated Jun. 8, 2011 issued in corresponding International Application No. PCT/GB2010/002146.
(Continued)

*Primary Examiner* — Venkat Perungavoor
(74) *Attorney, Agent, or Firm* — Nixon & Vanderhye P.C.

(57) ABSTRACT

An intrusion detection device (61) for monitoring one or more target devices and detecting malicious software operating on one of the one or more target devices. The intrusion detection device has an interface arrangement (61, 10) comprising one or more interfaces (6110) for receiving inward bound traffic destined for the one or more target devices and outward bound traffic originating from the one or more target devices. The intrusion detection device (61) also includes categorization means (6140) for categorizing incoming service requests destined for one of the one or more target devices as either harmless or potentially suspicious; monitoring means (6150) operable, in respect of each incoming service request identified as being potentially suspicious, to monitor the behavior of the associated target device for behavior indicative of the target device operating as a proxy server; and a notifier (6160) for generating a notification in the event that the monitored behavior is indicative of the device acting as a proxy server.

11 Claims, 2 Drawing Sheets

(56) References Cited

OTHER PUBLICATIONS

Xin Hu, Matthew Knysz, Kang G. Shin: "RB-Seeker: Auto-detection of Redirection Botnets", Jul. 11, 2009, pp. 1-17, XP002587668 (17 pgs.).

Peter Wurzinger et al: "Automatically Generating Models for Botnet Detection", Sep. 21, 2009, Computer Security a Esorics 2009, pp. 232-249, XP019129284 (17 pgs.).

\* cited by examiner

DETECTING MALICIOUS BEHAVIOUR ON A NETWORK

This application is the U.S. national phase of International Application No. PCT/GB2010/002146, filed 19 Nov. 2010, which designated the U.S. and claims priority to EP Application No. 09252660.7, filed 20 Nov. 2009, the entire contents of each of which are hereby incorporated by reference.

FIELD OF THE INVENTION

The present invention relates to detecting malicious behaviour on a network, in particular a computer network. In particular it relates to a method and apparatus for detecting network behaviour associated with the use of "fast flux service networks" in which maliciously infected devices act as intermediate agents between a user device and a malicious server which the user device is attempting to contact (e.g. because of a misleading link contained in another web page or within an email etc. which is purporting to link through to a legitimate website rather than to a malicious website).

BACKGROUND TO THE INVENTION

Fast Flux Service Networks use the fast flux technique to hide servers hosting malicious content from Internet Service Providers who might otherwise close down the web sites hosted by the malicious web servers. The fast flux technique is a DNS technique used by botnets to hide, for example, phishing and malware delivery sites behind an ever-changing network of compromised hosts acting as proxies. It can also refer to the combination of peer-to-peer networking, distributed command and control, web-based load balancing and proxy redirection used to make malware networks more resistant to discovery and counter-measures. The Storm Worm is one of the recent malware variants to make use of this technique.

There have been several attempts to specify ways in which such behaviour can be detected and/or mitigated against. Most of these, which concern detecting fast flux service networks, operate by looking for characteristic properties of the website (e.g. it's registered domain owner) or of the result of performing DNS queries for the website's URL (especially in examining the DNS A records for the URL etc.). The two papers discussed below are representative of such approaches.

Thus, a paper entitled 'Fast Flux Service Networks: Dynamics and Roles in Hosting Online Scams" by Maria Konte and Nick Feamster, studies the fast flux behaviour and in it the authors report that they noticed through their studies that the fast flux IP addresses are spread across IP address space. They also note that fast flux networks tend to use a different portion of the IP address space to that used by legitimate sites. They have also noticed that fast flux infected hosts are typically widely geographically distributed and this widespread geographical dispersion can also be used for detecting fast flux hosts. They suggest that some sort of detection process could be generated which looks for patterns such as these but propose this as future work.

Similarly, a paper entitled "FluXOR: detecting and monitoring fast-flux service networks" by Emanuele Passerini, Roberto Paleari, Lorenzo Martignoni and Danilo Bruschi from the University of Milano and published in DIMVA 2008, LNCS 5137, pp. 186-206, 2008, describes a mechanism which attempts to identify web sites which are hiding behind a fast flux service network. Their detection mechanism involves querying various DNS servers for the URL of a suspected website, as though it were a normal user device (i.e. a "victim" device if the website is malicious) on a frequent basis for a fairly large number of times. If the website being tested is being serviced by a fast flux service network, then each query is likely to result in many different (fast flux agents') IP addresses being provided in the A record. Their detection mechanism is based on a naïve Bayesian classifier which processes several different parameters some of which are obtained from the results of the DNS queries and some of which relate to information about the registered domain name owner details for the website being tested (presumably obtained from the WHOIS service).

A well known security provision for use with computer networks generally is the firewall. A firewall is generally established at the entrance to a private network or in respect of a single device and acts to prevent certain types of incoming traffic from passing through the firewall (and also in some cases acts to prevent certain outgoing traffic from passing through the firewall). In general, a well configured firewall should be able to prevent devices from operating as fast flux proxy servers (and indeed should prevent devices from becoming infected with malicious fast flux proxy server code in the first place); however, firewalls may become corrupted by malicious software or an individual device may not have an appropriate firewall installed or switched on (or may have it improperly configured) and so a firewall approach is not perfect. Furthermore, some users may prefer to avoid using firewalls since they can interfere with tasks which the user is trying to perform intentionally; although in general a private firewall can be configured to always correctly allow a user's desired traffic to pass safely through this can be difficult to achieve correctly and many users may simply prefer to turn the firewall off. Finally there may be some situations where it is impractical or objectionable to use a standard firewall (e.g. at a point in a public access network such as at a DSLAM or BRAS, etc.).

Xin Hu, Matthew Knysz, Kang G. Shin: "RB-Seeker: Auto-detection of Redirection Botnets" 11 Jul. 2009 (2009-07-11), pages 1-17, XP002587668 describes a system for detecting domains (i.e. Internet domains e.g. ADomain.com as part of a Universal resource Locator such as www.ADomain.com) which are hidden behind a redirection "botnet"; in particular, the system aims to be able to distinguish malicious redirection botnets from legitimate systems such as legitimate Content Distribution Networks which behave in a similar manner to redirection botnets. The system includes a component which examines NetFlow data (taken from a core router of a large university) and probabilistically identifies redirection behaviour based on transport-layer information available in NetFlow records (packet contents are not available, making it impossible to examine packet payloads and detect redirection behaviour via HTTP status code or refresh headers. It also includes a component which attracts spam emails (a spam honey pot) and then follows any suspicious (not whitelisted) URLs to try to identify redirection behaviour when following the URLs. Finally the system includes a component which attempts to distinguish between the suspected botnet redirection cases and legitimate redirection systems such as CDN's as mentioned above.

SUMMARY OF THE INVENTION

According to a first aspect of the present invention, there is provided a method of detecting malicious behaviour on a local network, the method comprising:
  identifying incoming service requests destined for a target device forming part of the local network as either harmless or potentially suspicious and, in respect of each incoming service request identified as being potentially suspicious, monitoring the behaviour of the target device for a predetermined time to try to find behaviour indicative of the target device operating as a proxy server, and, in the event that the monitored behaviour is indicative of the device acting as a proxy server, taking further steps to prevent the target device acting as a component of a fast flux network.

An important feature of the present invention is that it is attempting to identify devices which are acting as proxy servers, rather than trying to identify servers hosting malicious content (i.e. the so called mother ships). This is a more modest and yet still important goal. Clearly if all of the devices which currently act as proxy servers could be "cleaned" and kept clean, then the mother ships would be unable to hide behind such fast flux proxy networks. Furthermore, the affected "zombie" devices are normally acting without the knowledge and consent of the legitimate users of the device and it would be beneficial to be able to protect such devices from becoming infected as the legitimate users would probably prefer that their devices were free of such malware even if it does not greatly impact their use of the device.

A key advantage of the present invention as set out above is that the size of the local network being covered can vary between a single computer (in which case the method is behaving very much like a sort of private firewall, but one which can be very permissive and thus is unlikely to be annoying to a user) or a large network comprising very many computers (e.g. within a single organisation) in which case the method is operating more along the lines of an enterprise firewall (and ideally it would be incorporated as part of the firewall). Alternatively, the method could be operated at an access network level (e.g. monitoring all user devices connected to a particular DSLAM or local exchange, etc.) or at an Internet Service Provider level (e.g. by monitoring all client devices connecting through a particular Broadband Remote Access Server (BRAS). In such cases a blocking firewall would be completely unacceptable whereas an intrusion detection system along the lines of the present invention could be employed since it could be used merely to inform users that they might be inadvertently harbouring some malicious software on their devices.

Preferably, incoming traffic is monitored in real time (i.e. not as part of a batch processing of stored network information) so that if behaviour indicative of a compromised device behaving as a fast flux proxy server is detected in respect of a target device, then steps can be taken immediately to minimise the proxy activities of the suspected compromised device (e.g. by blocking incoming HTTP or DNS requests to the device, etc.). Furthermore, by looking initially for suspicious incoming requests only, the amount of monitoring to be performed can be reduced. Since additional monitoring of outbound requests (which would be expected to form the bulk of such traffic for normal, non-server, end-user host devices) only needs to be undertaken in respect of devices for which some suspicious incoming requests have been received, the total amount of monitoring which needs to be performed can be maintained at reasonable levels.

The most preferred further steps to take may depend upon the size of the local network being monitored as well as the relationship between the party controlling the monitoring and the party controlling the device(s) being monitored. For example for a host intrusion detection system where just a single device (having a single user who is also the sole administrator for the device) is being monitored and the person in charge of configuring the intrusion detection system is the same as the administrator of the device, then the user/administrator of the device can directly control what further action should be taken (e.g. dropping any suspicious seeming proxy request messages and alerting the user to the arrival of such requests). For larger networks, it may be more appropriate to simply send some kind of notification (e.g. by email) to the user of the target device to advise that they may have a fast flux proxy server running (probably unbeknownst to them) on their device and that they can take certain steps to ascertain if this is actually the case and if so what further steps they can take to remove the malicious software and to prevent similar malicious software from getting back onto their device once the current infestation has been removed. If the local network is for a corporate network it may be that it would be appropriate for such steps to merely be taken automatically by the administrator of the network where the target device is a corporate device (and therefore ultimately the responsibility of the network administrator rather than the user).

Monitoring the behaviour of the target device may include monitoring the outbound IP traffic from the target device to see if it appears to be generating HTTP requests in response to any incoming (proxy) HTTP requests. In the simplest case one would expect a proxy request to take the standardised proxy request form (e.g. including the full "URI path" in the request line rather than just the "absolute path") and so such a request could be viewed as suspicious. In more deceptive cases the request may appear as a direct request and yet still be proxied by the malicious proxy server device being harboured inadvertently by the user device. There are a number of fairly simple steps that may be taken automatically by the intrusion detection system (especially in the case where an ISP is monitoring a large number of customer devices, some of which could be acting as perfectly legitimate web servers or even legitimate proxy servers) upon receipt of an http GET request (whether in the proxy GET format or formulated as a direct GET request).

These include 1) looking to see if incoming get requests generate corresponding outgoing get requests, 2) performing periodic DNS lookup requests for the host specified in the get request, 3) examining the request to see if it specifies an unusual port number, and 4) checking if there is any relevant stored information about the target device.

Strategy 1) above can be useful either in the case that the get requests are simply ignored by the target device—in that case it is likely that they are simply spurious or malicious but unsuccessful attempts on the target device which (since it is simply ignoring the requests) is not running any malicious software—it may for example be that it has recently removed some malicious software successfully, but that the bot net has not yet realised that this is the case. Strategy 1) can also identify suspicious behaviour if it correlates incoming direct GET requests with outgoing GET requests. If it were behaving as a completely open and correct proxy server a normal compliant client should be sending correctly formatted proxy GET requests to it, not direct GET requests. If correlated outgoing GET requests are detected, these could prove useful in tracking down the actual IP address of the mothership of a bot net and so can provide useful information to ISP's etc.

Strategy 2) is useful to identify fast flux proxy network behaviour since DNS requests for these will tend to obtain markedly different results over time compared with DNS requests for hosts not hiding behind a fast flux proxy network. For example, a host hiding behind a fast flux proxy network will tend to receive very different responses even for identical requests space apart in time by only a fairly small amount (e.g. even as little as 5 minutes apart).

Strategy 3) is useful because often malicious software will use non-standard port numbers whereas legitimate web servers (and proxy web servers) tend to use the well known port 80 for incoming HTTP get requests. Although there is nothing wrong with using non-standard port numbers it is not normally done by legitimate web servers and so detecting HTTP requests addressed to ports other than port 80 is somewhat suspicious and possibly worthy of notifying the user of the target device accepting http requests to such a port.

Finally, strategy 4) can be used either to quickly identify legitimate requests (e.g. based on a stored white-list of well know legitimate IP addresses for legitimate web servers) or to quickly identify illegitimate requests (e.g. based on a black-list of devices known to be not allowed to run web servers or proxy web servers—e.g. because they are corporate devices and the corporate policy prohibits its employees form running web servers or proxy web servers on these devices).

It should also be noted that the potentially suspicious incoming service request need not be an http GET request. In particular another important service request to monitor is a DNS lookup request since it is known for fast flux bot nets to also use a network of proxy DNS servers in order to hide the authoritative DNS server for the malicious web site. If a DNS lookup request message is identified as being directed towards a target device, then similar strategies to those used above for suspicious HTTP GET requests can be used, with the exception of strategy 3 of looking for unusual port numbers since DNS requests are generally speaking always sent to port 53 (either as UDP, most commonly, or else using TCP). However, strategies 1, 2 and 4 are still applicable; namely, one can try to detect correlated outward going DNS lookup requests from the target device corresponding to the detected incoming requests (strategy 1). Periodic DNS lookups for the host identified in the potentially suspicious request can be made (again one would expect results that vary significantly over fairly short periods of time—strategy 2). Finally, one can check within an appropriate database (whether stored locally or remotely, whether private or public, etc.) for information about the target device which may help to ascertain if the request is likely to be indicative of malicious software running on the target device (e.g. if the target device appears on a white list of devices known to be running legitimate DNS servers, then the request is unlikely to be suspicious, etc.).

According to a second aspect of the present invention, there is provided an intrusion detection device for monitoring one or more target devices and detecting malicious software operating on one of the one or more target devices, the intrusion, detection device having:

- at least one interface arrangement comprising one or more interfaces suitable, in operation, for receiving inward bound traffic destined for the one or more target devices and outward bound traffic originating from the one or more target devices;
- categorisation means for categorising incoming service requests destined for one of the one or more target devices as either harmless or potentially suspicious;
- monitoring means operable, in respect of each incoming service request identified as being potentially suspicious, to monitor the behaviour of the associated target device for behaviour indicative of the target device operating as a proxy server; and
- a notifier for generating a notification in the event that the monitored behaviour is indicative of the device acting as a proxy server; whereby
- an administrator or related application can take steps to prevent or mitigate against the target device acting as a component of a fast flux network.

Depending on the configuration of the device a single interface may be used to monitor both incoming and outgoing traffic. For example, if the target devices are connected to a single Ethernet Local Area Network (LAN), then the intrusion detection device can simply take the form of a dedicated host having a single Ethernet interface set to operate in promiscuous mode. As an example of how such an intrusion detection device could be implemented, one could use some readily available software such snort (see world wide web site snort.org) installed on a stand alone standard computer having an Ethernet interface (e.g. using a network interface card) set to operate in promiscuous mode. This will then receive all traffic passing on the LAN regardless of its direction and will therefore be able to monitor all traffic passing on the LAN including inward and outward bound traffic.

If the device is implemented as a host intrusion detection device, this can be done simply by including some suitable software (again snort could be used for this purpose) on the (single) host device to be monitored. In such a case the intrusion detection algorithm is preferably configured to receive all incoming and outgoing traffic going via an interface to the computer network to which the host is connected. Such software can be thought of as sitting between the transport layers (e.g. the TCP and UDP stacks) and the application layers, or between the data link layers (e.g. the Ethernet stack) and the transport layers, or it could assume all of the functions of either or both of these layers and simply replace such layers altogether.

One preferred place to implement an intrusion detection system according to the present invention would be within a router type device, such as, for example, within a device such as the BT Home Hub (registered trade mark of British Telecommunications plc) which includes both a modem (e.g. an ADSL modem) and an Ethernet router. All traffic passing through the home network whether internally or to or from and external device will pass though such a device and should therefore be easily able to be monitored by an intrusion detection system located within such a device.

Another preferred location for placing the intrusion detection system is within the first IP hop device beyond the ADSL router at the end user's end, which is usually in current systems the Broadband remote Access Server (BRAS) or an equivalent device (alternatively a dedicated intrusion detection system could simply be connected to such a device). Placing the intrusion detection system downstream of such a device incurs the disadvantage that it would require that the IP datagrams are reconstructed from the data link layer encapsulations (e.g. ATM cells) in order to easily monitor the traffic flow to look for suspicious behaviour, however this may be advantageous in terms of reducing the number of target devices to be monitored by each intrusion detection system, etc.

According to a further aspect of the present invention, there is provided a method of detecting malicious behaviour on a local network, the method comprising:

- identifying incoming service requests destined for a target device forming part of the local network and, in respect of each incoming service request identified as being for a potentially suspicious service, examining the incoming service request and performing one or more of the following determinations:
  - determining if the target device is permitted to run the requested service;
  - determining if the request has the form of a proxy HTTP GET request;

determining if the target device issues outgoing service requests which are correlated with the incoming service request.

Further aspects of the present invention relate to computer programs for implementing the intrusion detection systems of the present invention or for carrying out the methods of the present invention, and to data carriers, preferably tangible data carriers such as magnetic (e.g. hard disk drives), optical (e.g. CD's and DVD's) or solid state (e.g. usb memory sticks) storage devices storing such programs, etc.

BRIEF DESCRIPTION OF THE DRAWINGS

In order that the present invention may be better understood, embodiments thereof will now be described with reference to the accompanying drawings in which.

DETAILED DESCRIPTION OF EMBODIMENTS OF THE INVENTION

Figure 1:
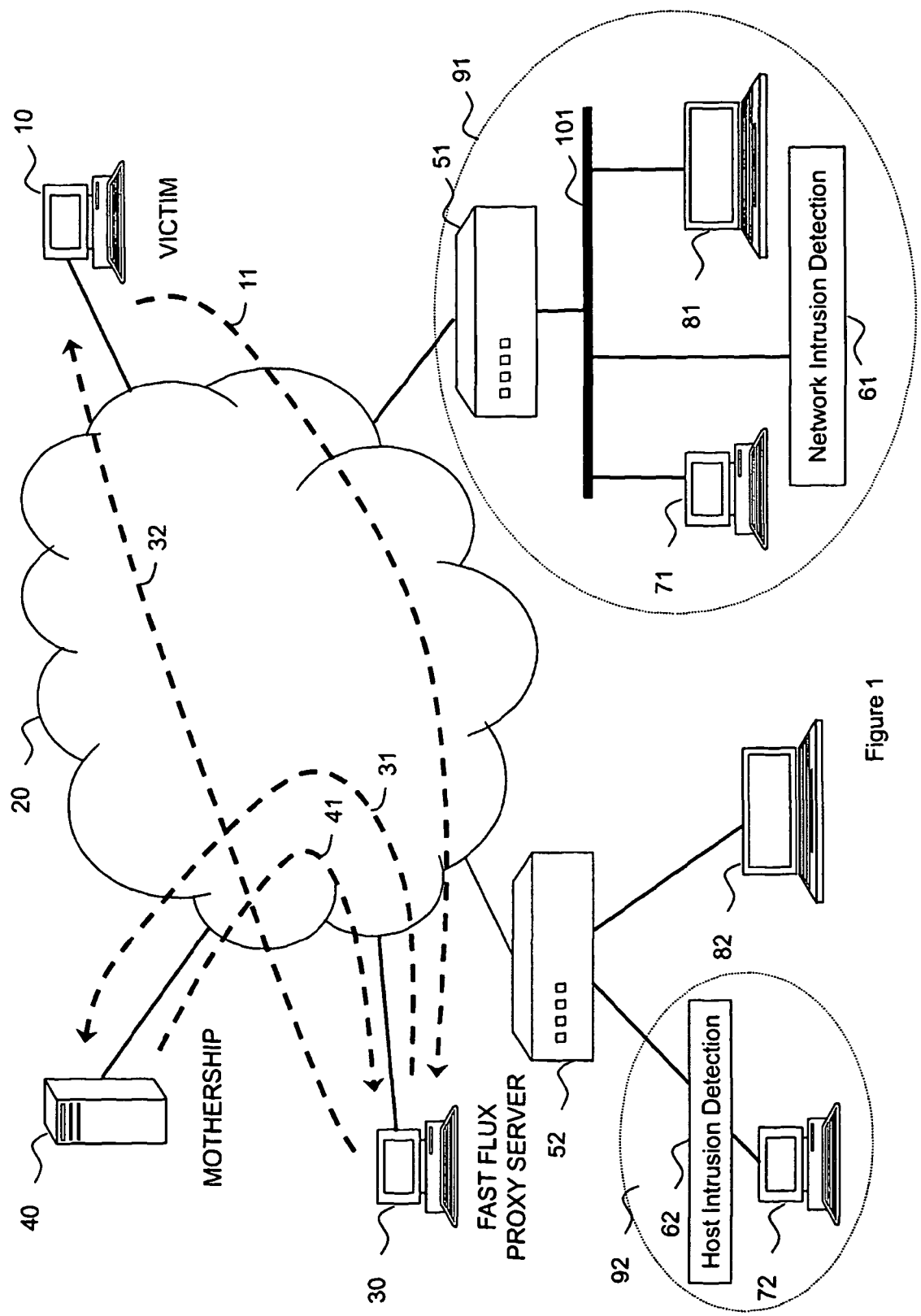
FIG. 1 is a schematic overview of a data network including intrusion detection systems embodying the present invention.

FIG. 1 illustrates a computer network comprising a plurality of edge devices illustrated individually with the remainder of the network illustrated as a cloud 20 providing general connectivity through the cloud 20 in an unspecified manner enabling any device which is connected to the cloud to communicate with any other device connected to the cloud 20. An example of a network which could be represented by the cloud 20 is the Internet. The individually illustrated edge devices are a "victim" host device 10; a fast flux proxy server 30, a "Mothership" web server 40; a first home network 91 (which comprises a first ADSL modem/router device 51 (e.g. a BT Home Hub) connected via an Ethernet LAN 101 to a first home PC device 71, a first home lap-top computer device 81 and a network intrusion detection device 61); and a second home network comprising a second ADSL modem/router device 52, a host intrusion detection system 62, a second home PC 71 and a second home laptop computer 82.

FIG. 1 also illustrates the transmission of traffic in a typical attack by a fast flux proxy network arrangement with traffic flows 11, 31, 41 and 32. In such an attack, the victim computer 10 attempts to contact a website address associated with the Mothership web server 40 (e.g. because the user has clicked on a hyper-link contained within a phishing email alleging to belong to a legitimate organisation such as a bank). In the normal manner, a web browser running on the victim computer will use the Domain Name System (DNS) to perform a DNS lookup of the correct host address to which to send an HTTP GET request based on the Uniform Resource Locator (URL) information contained within the link. For example, the URL might specify www.barclays.pleaseconfirmyourdetails.com this would then be sent by the victim computer 10 to its local DNS name server, which would resolve the Fully Qualified Domain Name (FQDN) www.barclays.pleaseconfirmyourdetails.com to an IP address of one of the proxy servers such as proxy server 30. The victim computer's web browser having received the IP address of the specified FQDN will then set up a TCP/IP connection with the received IP address (using port 80 by default for WWW purposes, unless another port has been specified in the URL, which it may well have been) and will then send as message 11 an HTTP message which it constructs using the information contained within the URL for example along the following lines:

GET http://www.barclays.pleaseconfirmyourdetails.com/index.html HTTP/1.1
Host: www.barclays.pleaseconfirmyourdetails.com
(if the Web browser knows it is sending the request to a proxy server) or
GET /index.html HTTP/1.1
Host www.barclays.pleaseconfirmyourdetails.com
(if the web browser does not know it is being sent to a proxy server).

Upon receipt of this message 11 at the proxy server 30, it forwards this message on to the Mothership as message 31 in a largely unchanged form (though it may modify the request if it is received in proxy format (i.e. the first version given above) into a non-proxy format (i.e. as per the second example above) if the message is going straight to the Mothership web server as in the present example). The proxy server may obtain the correct IP address for the Mothership either by storing this locally or by performing a DNS query on a different FQDN which does resolve to the correct IP address for the Mothership (rather than to a proxy server—note if a DNS request was made for www.barclays.pleaseconfirmyourdetails.com it would provide the IP address of another proxy server, and not that of the mothership 40).

Upon receipt of the message 31, the Mothership web server 40 obtains the content which it wants to be transmitted to the victim computer 10 (e.g. a web page purporting to be from a legitimate organisation and requesting the user to enter personal details which can then be used to steal money from a user's bank account, etc.) and returns this in an HTTP response message 41 (e.g. a status 200 response message). This response message is then forwarded (again largely unchanged) by the proxy server 30 to the victim computer 10 as message 32.

Intrusion Detection

The operation of the Network Intrusion Detection system 61 will now be described in overview with reference to FIG. 1. Should one of the computer devices 71, 81 in the home computer network 91 become infected with malicious software causing it to operate as a proxy server (forming part of a fast flux network), then a subsequent attempt by the victim computer 10 to contact the malicious FQDN associated with the Mothership web server 40 could result in a GET request being sent to the infected computer device (e.g. home PC 71). The Network Intrusion Detection (NID) device 61 operates in promiscuous mode and so will receive such a request. The NID device 61 is configurable with rules to ascertain whether or not a received message is potentially suspicious or not. An example rule would be to assume that all incoming HTTP GET requests are potentially suspicious. If the home PC 71 is actually running a legitimate web server, the rule could be enhanced to treat only all HTTP GET requests whose Host: field does not match the FQDN (or FQDN's) of the legitimate web server or servers running on the home PC 71 and/or all HTTP GET requests addressed to a port number which is not (one of) the port number(s) on which the legitimate server(s) is (are) listening. Similarly, all DNS requests could also be treated as being potentially suspicious.

Having detected a potentially suspicious request message directed towards one of the target computers (i.e. addressed to home PC 71) the NID device 61 can take a number of actions to try to ascertain with greater certainty if the Home PC is running a fast flux proxy server. One such action is to monitor the outgoing messages from home PC 71 (which will also pass over the LAN 101 and thus be received by the NID device 61 since it is connected to the LAN 101 and is operating in promiscuous mode). In the event that an outgoing HTTP GET request requesting the same resource as the suspicious incoming GET request is observed (at least if it is observed within a predetermined period of time from its receipt of the incoming message), this is fairly conclusive that the home PC 71 is running a proxy server. The rules associated with the NID device 61 could at this stage trigger a notification to be sent to the administrator of the home PC 71 (or possibly of the network if this is different) or to some other application which may take more draconian action such as causing a malicious software removal tool to be run on home PC 71, etc. Alternatively, the Rules might require that further corroborative evidence is obtained before such action is taken.

For example, the NID device 61 may include means for performing repeated DNS lookups using its normal local DNS name server (e.g. associated with the Internet Service Provider (ISP) of the home network 91) of the Host name given in the incoming HTTP GET request and then analysing these to see if the repeated requests generate differing A records (i.e. IP addresses) (e.g. a rule could specify that if more than 10 distinct IP addresses which are not contained in the response to the first test DNS request are returned from the second or subsequent DNS requests, then it is indicative of a fast flux proxy network FQDN). Depending upon the configuration/rules of the NID device 61 this DNS evidence could be used to trigger a notification either on its own or only in combination with having observe an outgoing HTTP GET request corresponding to a potentially suspicious incoming one. Alternatively, the nature of the notification sent to the administrator of the home PC 71 could be different depending upon whether or not an outgoing message was also detected (e.g. if no outgoing message is detected but the DNS queries seem to indicate that the incoming message was intended to be destined for a fast flux proxy service, a message pointing out that such an incoming message has been observed and that it may therefore be worthwhile running a malicious software removal tool, unless this has been done recently (explaining perhaps why there was no corresponding outgoing message).

A further aspect to the NID device 61 may include a store where details of any web or DNS servers and/or proxy servers operating on the target devices (i.e. home PC 71 and home laptop 81) are stored. Any incoming request messages or outgoing response messages which are not destined for or originating from web and/or proxy servers whose details are not contained in the store can be treated as being suspicious and thus cause the generation of an appropriate notification, etc.

The operation of the Host Intrusion Detection (HID) device 62 is basically the same as that of the NID 61 except that its local "network" 92 that it monitors comprises only the host device on which it is implemented (i.e. the second home PC 72). It is arranged to receive all incoming and outgoing traffic from the host device 72 and to be able to identify any potentially suspicious messages and then to perform additional monitoring as described above if any such potentially suspicious messages are observed.

Figure 2:
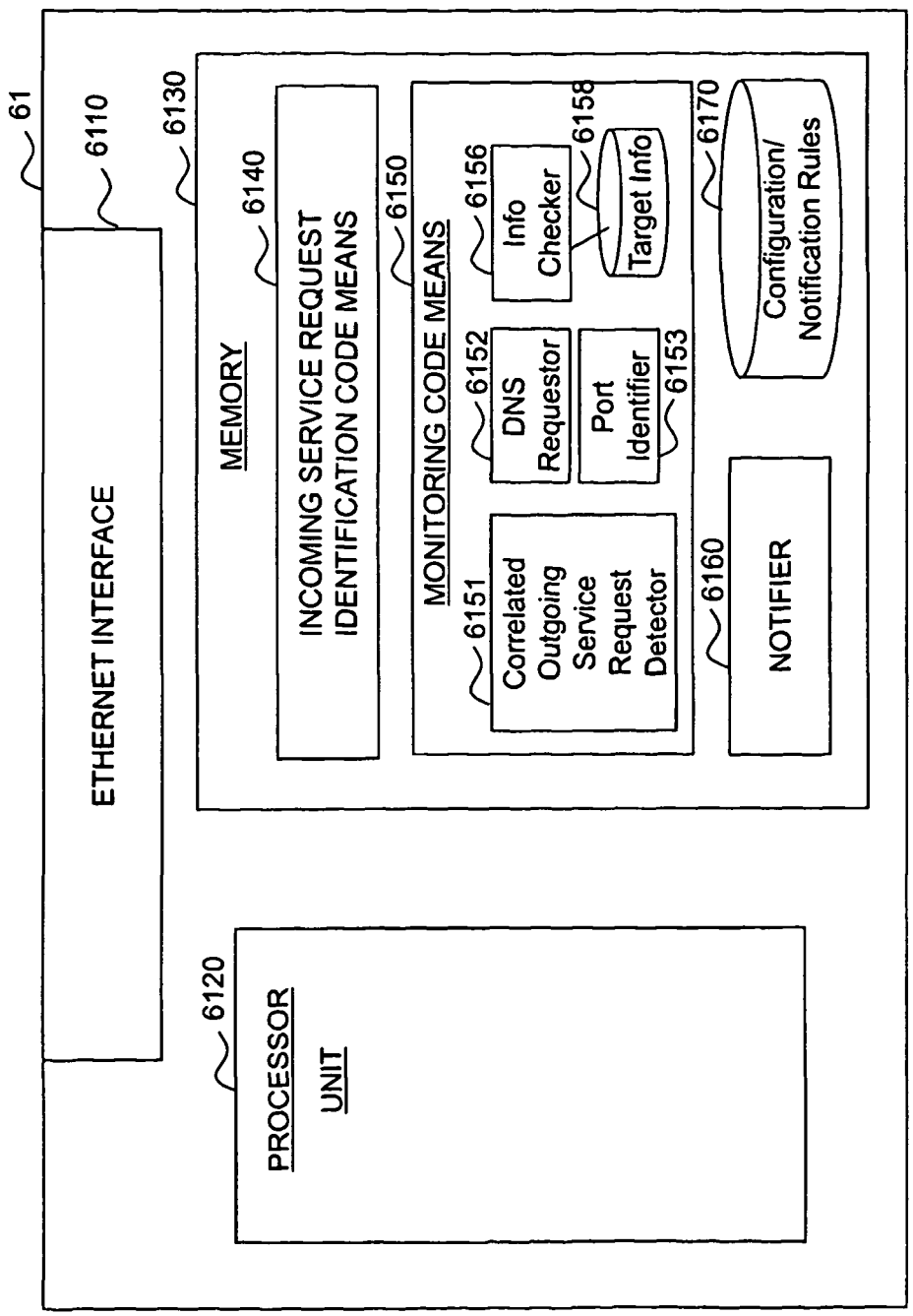
FIG. 2 is a schematic illustration of one of the intrusion detection systems of FIG. 1.

FIG. 2 illustrates in schematic block diagram form the main components of the NID device 61. As can be seen from FIG. 2, NID device 61 comprises an interface, in this case an Ethernet interface 6110, a processor unit 6120 and a memory 6130. The memory contains Incoming service request identification code means 6140, monitoring code means 6150, a notifier 6160 (also in the form of code means) and a configuration/notification rules data store 6170. The incoming service request identification code means 6140 is operable to cause the processor to examine incoming traffic received over the Ethernet interface 6110 to identify potentially suspicious incoming requests such as HTTP GET requests and corresponding outgoing HTTP GET requests. The monitoring code means 6150 contains several subunits, namely a correlated outgoing service request detector 6151 which determines if an outgoing service request (such as an HTTP GET request) correlates with an incoming service request in such a way as to indicate that the target device in question is operating as a proxy server. The monitoring code means 6150 also contains a DNS requestor 6152 which is operable to make repeated DNS requests to the LAN 91's local DNS nameserver to resolve the FQDN of a suspicious incoming HTTP GET request and to analyse the results of these requests to identify if the results are indicative of the FQDN being associated with a fast flux network. The monitoring code means also includes a port identifier for identifying the port to which potentially suspicious requests are being sent and to cause a notification to be sent if the port is deemed suspicious based on information stored in the Configuration/Notification rules database (e.g. if the target device is running a legitimate web server which accepts http requests but only on port 80, then any http request directed to a port other than port 80 may be considered as being suspicious and detected by the port identifier as such an reported to the notifier 6160 for appropriate treatment by the notifier 6160—i.e. to either take some action or not depending on the rules stored in the configuration/notification rules data store 6170). The monitoring code means 6150 also includes an Information Checker 6156 and associated target information data store 6158, the latter of which 6158 stores information about the target device(s) and the former of which 6156 uses this store to retrieve any potentially useful information based on a target device identified in a received potentially suspicious service request directed to that target device. An example of such information could be the Host name of any web services legitimately running on the target device such that service requests for legitimately running services on the target device are ignored or generate only low level notifications for logging purposes only, etc. The Notifier 6160 operates together with all of the other elements in the memory 6130 including the Configuration/Notification rules data store to ascertain whether an event requires a notification to be generated, and if so what should be included in the notification and where it should be sent to. in general all notifications will be logged in a suitable data store for analysis by an administrator. in addition, certain combinations of events as detected by the monitoring components of the NID device 61 may cause notifications to be sent in a more overt manner (e.g. generating an email to send to the system administrator) or sending a notification to another application (e.g. a malicious software removal tool) to cause some automated action to occur (e.g. running of the tool on the target device). Alternatively the notification could be sent to the router 51 to prevent the target device from accessing any content from the network or responding to any incoming requests and instead sending simply a warning web page to the browser whenever a request for content form the Internet is requested, to require the user to perform some sort of cleansing action such as running a malicious software removal tool, etc.

Alternatives

An alternative location for a Network intrusion Detection device for monitoring potential suspicious service requests may be deeper within the access network, for example with an ISP at or near a Broadband remote access Server (BRAS) or an equivalent device.

Note that although the preferred embodiment described using an Ethernet LAN interface, any kind of link layer protocol may be used instead if a separate network intrusion detection device is being used, such as, for example, a point-to-point protocol.

The invention claimed is:

1. A computer implemented method of detecting malicious behaviour on a local network, the method comprising:
identifying incoming service requests received by a target device forming part of the local network as either harmless or potentially suspicious and, in respect of each incoming service request identified as being potentially suspicious, and
monitoring the behaviour of the target device for a predetermined time for behaviour indicative of the target device operating as a proxy server, and, in the event that the monitored behaviour is indicative of the device acting as a proxy server generating a notification indicative of the observed behaviour,
wherein said monitoring includes performing repeated DNS lookups of any fully qualified domain name specified in the identified potentially suspicious service request and analysing the results of such lookups for signs of the fully qualified domain name being associated with a fast flux proxy network.

2. The method according to claim 1 wherein said identifying incoming service requests includes identifying if the incoming service request is in a proxy format and categorising the service request as potentially suspicious if it is in a proxy format.

3. The method according to claim 1 wherein said monitoring includes monitoring outbound service requests issued from the target device and identifying any correlated outbound service requests as indicative of potentially suspicious behaviour by the target device.

4. An intrusion detection device for monitoring one or more target devices and detecting malicious software operating on one of the one or more target devices, the intrusion detection device comprising:
a processor;
at least one interface arrangement comprising one or more interfaces suitable, in operation, for receiving inward bound traffic received by the one or more target devices and outward bound traffic originating from the one or more target devices;
a categoriser configured to categorize incoming service requests destined for one of the one or more target devices as either harmless or potentially suspicious;
a monitor configured to, in respect of each incoming service request identified as being potentially suspicious, monitor the behaviour of the associated target device for behaviour indicative of the target device operating as a proxy server; and
a notifier configured to generate a notification in the event that the monitored behaviour is indicative of the device acting as a proxy server;
wherein said monitor is further configured to perform repeated DNS lookups of any fully qualified domain name specified in the identified potentially suspicious service request and analyze the results of such lookups for signs of the fully qualified domain name being associated with a fast flux proxy network.

5. A non-transitory computer-readable storage medium storing a computer program or suite of computer programs for causing an intrusion detection system to carry out the method claim 1.

6. A non-transitory computer-readable storage medium storing a computer program or suite of computer programs which upon execution by a computer system performs the method of claim 1.

7. The device according to claim 4 wherein the categoriser is configured to identify if the incoming service request is in a proxy format and categorize the service request as potentially suspicious if it is in a proxy format.

8. The device according to claim 4 wherein the monitor is configured to monitor outbound service requests issued from the target device and identify any correlated outbound service requests as indicative of potentially suspicious behaviour by the target device.

9. An intrusion detection device for monitoring one or more target devices and detecting malicious software operating on one of the one or more target devices, the intrusion detection device having:
at least one interface arrangement comprising one or more interfaces suitable, in operation, for receiving inward bound traffic received by the one or more target devices and outward bound traffic originating from the one or more target devices; and
a processing system, having at least one processor, configured to:
categorize incoming service requests destined for one of the one or more target devices as either harmless or potentially suspicious;
monitor, in respect of each incoming service request identified as being potentially suspicious, the behaviour of the associated target device for behaviour indicative of the target device operating as a proxy server; and
generate a notification in the event that the monitored behaviour is indicative of the device acting as a proxy server;
wherein the processing system is further configured to perform repeated DNS lookups of any fully qualified domain name specified in the identified potentially suspicious service recquest and analyze the results of such lookups for signs of the fully qualified domain name being associated with a fast flux proxy network.

10. The device according to claim 9 wherein the processing system is further configured to identify if the incoming service request is in a proxy format and categorize the service request as potentially suspicious if it is in a proxy format.

11. The device according to claim 9 wherein the processing system is further configured to monitor outbound service requests issued from the target device and identify any correlated outbound service requests as indicative of potentially suspicious behaviour by the target device.

* * * * *